United States Patent [19]

Hernandez et al.

[11] Patent Number: 4,636,326

[45] Date of Patent: Jan. 13, 1987

[54] THICKENER COMPOSITIONS FOR WATER-BASED HYDRAULIC AND METALWORKING FLUID COMPOSITIONS

[75] Inventors: Paul M. Hernandez, Lake County, Ill.; Curtis R. Petersen, Racine County, Wis.

[73] Assignee: S. C. Johnson & Son, Inc., Racine, Wis.

[21] Appl. No.: 680,710

[22] Filed: Dec. 12, 1984

[51] Int. Cl.$^4$ ............................................. C09K 5/00
[52] U.S. Cl. ...................................... 252/77; 252/79; 524/539; 525/440
[58] Field of Search .................. 524/539; 525/440; 252/77, 79

[56] References Cited

U.S. PATENT DOCUMENTS

| | | | |
|---|---|---|---|
| 4,312,768 | 1/1982 | Nassry et al. | 252/32.7 |
| 4,317,740 | 3/1982 | Eisenhard | 252/49.3 |
| 4,368,133 | 1/1983 | Forsberg | 252/75 |
| 4,395,351 | 7/1983 | Camp | 252/315.1 |
| 4,426,485 | 1/1984 | Hoy et al. | 524/591 |

FOREIGN PATENT DOCUMENTS 1069735 5/1967 United Kingdom .

OTHER PUBLICATIONS

Webb & Holodnik article in Journal of American Society of Lubrication Engineers entitled: Statistical Evaluation of the Falex Tapping Torque Test, vol. 36, pp. 513-529, 9/80.

*Primary Examiner*—Lewis T. Jacobs

[57] ABSTRACT

Thickener compositions, hydraulic fluid and metalworking fluid concentrates, aqueous concentrates and water-based hydraulic fluid and metalworking fluid or lubricant compositions are thickened to an oil-like viscosity by a low solids combination of thickeners. The combination of thickeners consists of at least one polyurethane and at least one dimer ester.

18 Claims, No Drawings

THICKENER COMPOSITIONS FOR WATER-BASED HYDRAULIC AND METALWORKING FLUID COMPOSITIONS

BACKGROUND OF THE INVENTION

This invention relates to thickener compositions for water-based hydraulic fluid compositions and metalworking fluid or lubricant compositions, which are thickened to an oil-like viscosity by the interaction of thickeners at a low solids concentration. More particularly, this invention relates to thickener compositions, hydraulic fluid and metalworking fluid concentrates, aqueous concentrates and water-based hydraulic fluid and metalworking lubricant compositions employing polyurethanes and dimer esters.

In hydraulic machinery, mechanical force is imparted to a fluid, known as hydraulic fluid, in the form of pressure by means of a hydraulic pump. The energy imparted to the hydraulic fluid is utilized by transforming this pressure energy back to mechanical energy by a hydraulic motor mechanism. In this manner, the hydraulic fluid is utilized as a pressure and volume transmitting medium. Therefore, the main function of a hydraulic fluid is power transfer.

According to U.S. Pat. No. 4,312,768, any non-compressible fluid can perform the function of a hydraulic fluid, including water. However, heavy emphasis has been placed on the development of petroleum oils for use as hydraulic fluids. Petroleum-based hydraulic fluids are said to offer several advantages over water-based hydraulic fluids. First, water-based fluids are said to suffer from the development of rust of the ferrous components of the mechanical equipment. Second, oil-based products have been reported to prevent the wear of machinery by lubricating the equipment. Third, oil-based products are believed to exhibit greater viscosity than water-based ones and thus account for the reduction of fluid leakage in the mechanical equipment utilized. Finally, the development of technology for fluid additives has advanced to such an extent that improvement in viscosity, foam stability, wear prevention and corrosion prevention properties is further enhanced by the use of such additives in oil-based hydraulic fluids.

However, even with the reported advantages of oil-based fluids, they continue to suffer from such deficiencies as flammability, higher costs, environmental pollution and/or disposal problems.

Additional important characteristics that a hydraulic fluid should possess include pump volume efficiency, which is closely related to its rheological properties, and good wear resistance. Low wear rates increase the pump life of a hydraulic fluid. Additionally, compositions which are stable throughout a temperature range not only maintain their viscosity, but also their chemical integrity.

Metalworking fluid compositions should also function to reduce friction and heat generation, hence to provide lubrication and cooling in the cutting area in order to extend tool life and improve workpiece finish. These two major effects, lubrication and cooling, are best accomplished by oil-based and water-based fluids, respectively. "Cutting and Grinding Fluids: Selection and Application", p. 5, R. K. Springborn (Ed.), Am. Soc. Tool & Mfg. Engs. (Dearborn, Mich. 1967).

Finally, the contamination of machine tool lubricants, i.e., hydraulic fluids by metalworking fluids and vice-versa, can be a serious problem. If the problem of contamination is ignored, costly repair of machines will result, together with increased machine down-time and loss of production. Multi-purpose fluids have been proposed to overcome this problem. However, there does not exist, to date, a water-based hydraulic and metalworking fluid which is free of the defects of petroleum-based fluids and which can provide enhanced viscosity, lubrication, stability and wear properties required for hydraulic machinery and the like.

Urethane polymers employed in aqueous thickening compositions are disclosed in U.S. Pat. No. 4,426,485. It is said that these urethane polymers provide better thickening and leveling characteristics than do traditional cellulosic thickening agents in waterborne coatings. Such thickened compositions are stated to be useful in a wide variety of applications. However, only latex compositions are mentioned. Additionally, no reference or suggestion is made to the use of these urethane polymers in hydraulic or lubricant systems in association with the dimer esters of this invention.

The application of shear to compositions containing the above-described urethane polymers decreases their viscosity to a significantly greater extent than when these urethane polymers are used in the presence of a dimer ester of this invention.

British Pat. No. 1,069,735 also discloses the use of urethene polymers as a thickening agent for aqueous preparations. These urethane polymers are the reaction products of polyethylene glycol ethers and isocyanates. These compositions are stated to be suitable for emulsions of cutting oils. However, this patent does not disclose or suggest the use of such urethane polymers in combination with the dimer esters utilized in this invention.

Dimer esters utilized as thickeners are disclosed in U.S. Pat. No. 4,317,740. This patent discloses that water-soluble polyesters, which are the condensation product of a polyoxyalkylene glycol of a particular molecular weight and the addition product of a dimer fatty acid and maleic anhydride, are useful as lubricants and viscosity adjusting additives in aqueous hydraulic systems. This patent, however, does not disclose or suggest the use of these dimer esters in association with the instant polyurethanes.

Moreover, the application of shear to compositions containing these dimer esters decreases their viscosity to a significantly greater extent than when these dimer esters are used in the presence of a urethane polymer of this invention.

U.S. Pat. No. 4,395,351 discloses polyether-based thickeners for aqueous systems. These thickeners are mixtures of a polyether and an ethoxylated phosphate ester, or the ester and a water-soluble amine. This patent, however, does not disclose or suggest the use of these polyether-based thickeners in combination with urethane polymers to achieve the superior viscosity and shear stability characteristics of the subject invention. Furthermore, this patent teaches that the selection of suitable thickening agents is an empirical and complex task. "The diversity of available thickening agents is an indication that not all are equally useful. It is not unusual to find some thickening agents which perform well in a certain environment and not at all in another environment. In [fact], in some uses, no one thickening agent is completely satisfactory and there is a continual need and a continuing search for new thickening agents to satisfy many unmet needs." (col. 1, lines 17–24).

Various efforts to produce thickened, water-based hydraulic and metalworking fluids have been proposed. For example, U.S. Pat. No. 4,312,768 discloses the preparation of thickened, water-based hydraulic and metalworking fluids. These fluids contain a water-soluble polyoxyethylated aliphatic ester, a sulfurized metallic compound, a phosphate ester salt, and a polyether polyol thickening agent, which is further modified by reaction with a alpha-olefin epoxide. However, there is no suggestion in this patent that fluids having excellent hydraulic and metalworking properties can be provided by the utilization of polyurethanes which interact with the dimer esters of the subject invention.

Accordingly, a need exists for thickened, water-based hydraulic and metalworking fluid compositions and concentrates which maintain a high viscosity after shear stress, in addition to providing sufficient lubrication, safety, environmental compatibility and reduced cost.

SUMMARY OF THE INVENTION

This invention in its broadest aspect relates to thickener compositions for water-based hydraulic fluid and/or metalworking fluid or lubricant compositions comprising (1) at least one water-soluble, thermoplastic, organic polymer having a weight average molecular weight of at least about 10,000 which comprises hydrophobic segments, each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer, and (2) at least one water-soluble polyester which comprises, the condensation product of (a) a polyoxyalkylene glycol having a molecular weight of from about 400 to about 1000; and (b) the addition product of (1) a dimer fatty acid; and (2) from about 0.4 to about 0.8 equivalents of maleic anhydride for each equivalent of the dimer fatty acid wherein about 2.1 to about 3.2 equivalents of the glycol are used for each equivalent of the addition product.

In a more limited aspect, the polymer is a urethane polymer of the structure:

wherein R and R' are each $C_{12}$-$C_{18}$ alkyls; R" is a $C_7$-$C_{36}$ alkyl; x is an integer from 90 to 455 and n is an integer from 1 to 4; and the polyester has the structure:

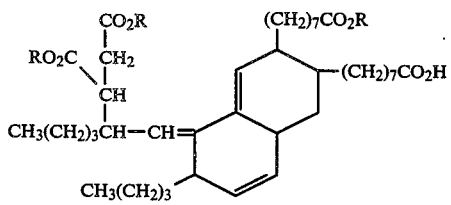

wherein R is a polyethylene glycol having an average value of 400 oxyethylene groups.

In other embodiments, this invention relates to fluid concentrates for water-based hydraulic fluid compositions comprising at least one polyurethane of the invention, at least one dimer ester of the invention, and one or more of the following: extreme pressure or antiwear additives, dispersants, nonionic or anionic surfactants, ferrous and/or non-ferrous corrosion inhibitors, and amines.

In still further embodiments, this invention relates to concentrates comprising at least one polyurethane of the invention and at least one dimer ester of the invention and any of the adjuvants set forth above in an aqueous carrier. In addition, the invention relates to aqueous hydraulic and metalworking compositions and formulations ready for use, which can include the aqueous concentrates diluted to a desired degree for immediate use.

It has been found that the combination of polyurethane and dimer ester produces an unexpectedly enhanced thickening effect to yield oil-like viscosities which exhibit shear stability. In addition to these enhanced Newtonian rheological characteristics, this thickener combination also contributes to lubrication and emulsification in aqueous hydraulic and metalworking fluids. This combination is unique in that neither of its individual components, the polyurethane or the dimer ester, alone, will give the superior rheological properties. Further, the superior viscosity and lubrication properties are obtained at surprisingly low total actives concentrations.

It has been further found that the shear stability observed with the fluid compositions of this invention is significantly greater than the stability values expected from the mere sum of its individual thickener components, e.g., the polyurethane and the dimer ester.

DESCRIPTION OF PREFERRED EMBODIMENTS

Polymers, such as disclosed in U.S. Pat. No. 4,426,485, which herein is incorporated by reference, may be utilized as one component of the thickener composition in accordance with this invention.

These polymers are described as water-soluble, thermoplastic, organic polymers having segments of bunched, monovalent, hydrophobic groups and an average molecular weight of at least about 10,000. The polymers have an amount of hydrophobic segments, such that each contain at least one monovalent hydrophobic group covalently bonded to the polymer, wherein at least two monovalent hydrophobic groups are present per hydrophobic segment, sufficient to provide for enhanced thickening of aqueous solutions containing the polymer.

In a preferred embodiment, the polymers are structurally defined to include those compounds having the formula I:

$$A-[B(C)_y]_x \qquad [I]$$

wherein A is a water-soluble polymer segment; B is a connecting segment comprising a covalent bond or a polyvalent organic radical; C is a monovalent hydrophobic group; the number of hydrophobe segments, x, defined by $B(C)_y$, is greater than 0; the number of hydrophobes, C, for each hydrophobic segment, defined as y, is greater than or equal to 1 providing an average of all y values, of greater than 1, such that the polymer has an amount of bunching comprising at least two hydrophobes per hydrophobic segment sufficient to provide for enhanced thickening of aqueous solutions containing the polymer. The y value sets forth the number of hydrophobes per hydrophobic segment. The x value sets forth the average number of hydrophobic segments per molecule. The average number of hydrophobes per hydrophobic segment, y', is greater than 1. The average number of hydrophobes per hydrophobic segment, y, is defined as a total number of hydrophobes (i.e., the summation of all hydrophobes per hydrophobic segment, $y_x$), divided by the total number of hydrophobic segments, x.

The connecting segment, B, may be water-soluble or water-insoluble. The hydrophobic segments, $B(C)_y$, may be attached in a pendant fashion to x terminal and/or interior bonds of the water-soluble polymer backbone A; or the connecting segment, B, may be incorporated as part of the polymer backbone between a plurality of water-soluble, polymer segments.

A more preferred class of polymers of the invention include those polyurethane polymers having the following structural formula II.

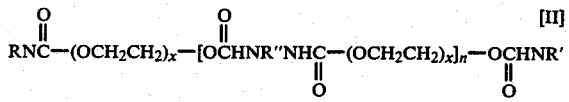

wherein R and R' are each $C_{12}$-$C_{18}$ alkyls; R" is a $C_7$-$C_{36}$ alkyl; x is an integer from 90 to 455 and n is an integer from 1 to 4.

Such compounds are polyether polyurethanes preferably having a molecular weight from 600 to about 50,000, more preferably from 1,000 to about 14,000. An especially preferred polyurethane is sold under the trademark UCAR Thickener SCT-100 by Union Carbide Corp. That thickener is commercially available as a solution having 50% nonvolatiles in a solvent of 40% wt. butyl "Cellosolve" and 60% water and has a Brookfield viscosity, 50% of 3000 cp. Butyl "Cellosolve" is a specific type of butoxyethanol, i.e., the ether alcohol that conforms to the formula: $C_4H_9OCH_2CH_2OH$, and is sold by the Union Carbide Corp.

Another class of especially preferred polyurethanes is represented by structural formula III as follows:

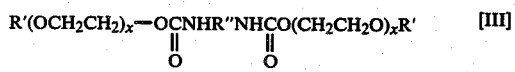

wherein R', R" and x are as before. These include the polyurethanes sold by Borchigel of Germany, under the trademark Borchigel L-75, having an Mw of 27,792 and an Mn of 14,527.

The HLB value (the hydrophilic-lipophilic balance) of the urethane polymers is a significant parameter. HLB values ranging from about 10 to 20 are preferably used in accordance with this invention, although higher and lower values are possible.

Dimer esters, such as disclosed in U.S. Pat. No. 4,317,740, which herein is incorporated by reference, may be utilized in accordance with this invention. These dimer esters are the condensation product of a polyoxyalkylene glycol and the addition product of a dimer fatty acid and maleic anhydride.

The polyoxyalkylene glycol reactants employed in the above described condensation reaction may be characterized in part by a molecular weight within the range of from about 400 to about 1,000. The preferred polyoxyalkylene glycols employed to prepare the polymeric polyesters are those of the formula IV:

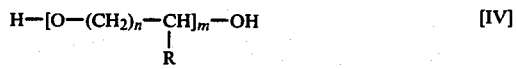

wherein R is selected from hydrogen and methyl, n represents an integer of 1 to 3 and m is such that the polymer of this formula has a molecular weight of about 400 to about 1,000. Representative of polyoxyalkylene glycols of this formula are polyethylene glycols, 1,2-polypropylene glycols, 1,3-polypropylene glycols, polybutylene glycols, poly(ethylenepropylene) glycols and the like. Polyethylene glycols having molecular weights from about 400 to about 1,000 are particularly preferred and are commercially available. The preparation of the preferred polyethylene glycols is also well known to those skilled in the art.

The condensation of the polyoxyalkylene glycol with the maleinized dimer fatty acid may be carried out employing conventional condensation techniques.

Maleinized fatty acids are generally well known reactant compositions, and their method of preparation is also well known. They and their dimer cousins are the adduct compositions obtained by the reactive addition of maleic anhydride to the unsaturated fatty acid. The proportion of dimer fatty acid and maleic anhydride employed in the maleinization of the dimer fatty acid is important to the preparation of these water-soluble polyester compositions. For each equivalent weight of dimer fatty acid employed in the maleinization reaction, preferably from about 0.4 to about 0.8 equivalents; and more preferably 0.6 equivalents of maleic anhydride, are employed.

Dimer fatty acids constitute a well known class of polymer fatty acids. Representative of dimer fatty acids are those which contain 32 to 54 carbon atoms. The latter dimer fatty acids may be prepared by the polymerization of monocarboxylic acids containing ethylenic unsaturation. The monocarboxylic unsaturated acids generally contain from about 16 to 26 carbon atoms and include, for example, oleic acid, linoleic acid, eleostearic acid and the like. Mixtures of dimer acids may also be employed. Commercially available dimer fatty acid compositions may be obtained freely in the marketplace.

The particularly preferred dimer esters of the invention are selected from those available under the family trademark "SFE Series" of dimer esters sold by Union Camp Corporation. The structural formula V of such compounds is as follows:

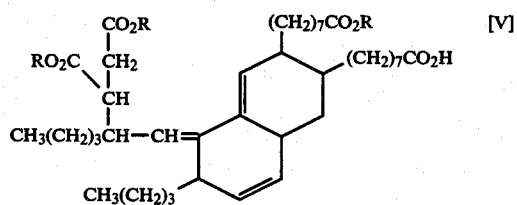

wherein R is a polyethylene glycol having 400 oxyethylene groups and available commercially under the trademark PEG 400.

The especially preferred dimer esters include those proprietary ester compositions available under the tradenames SFEX-81-360-187 and SFE-197-31 from Union Camp Corp. SFE-197-31 is sold as an aqueous solution having a 25° C. viscosity of 1800, a specific gravity at 25° C. of 1.074, an acid value (mg KOH/g) of 9, a hydroxyl value (mg KOH/g) of 112 and a pour point of −18° C.

Other thickeners that may be substituted in part or employed together with dimer esters of the invention are disclosed in U.S. Pat. No. 4,395,351. Such compounds are alpha olefin oxide-modified polyethers combined with a water-soluble amine and an ethoxylated phosphate ester or an ethoxylated aliphatic phosphate ester.

In the thickener composition of the invention the weight ratio of polyurethane to dimer ester can range from about 100:1 to 1:100, preferably from about 20:1 to 1:20, more preferably, from about 5:1 to 1:15, and, most preferably, from about 5:3 to 1:1.

In another embodiment of the invention, an aqueous concentrate is formulated having from about 20 to 50% water based on the total weight of the composition. The aqueous concentrate contains from about 0.05 to 50 weight percent of said polyurethane thickener and from about 0.05 to 50 weight percent of said dimer ester of the invention. Unless otherwise indicated all weights herein are in weight percent of the total composition.

In still another aspect, water-based functional fluids are formulated. For this purpose the aqueous concentrates of the invention may be diluted such that the water content of the final aqueous fluid composition is from about 60 to 99 percent by weight. In this embodiment the polyurethane and dimer ester concentrations are each employed in amounts from about 0.05 to 25 weight percent, preferably from about 1 to 10 weight percent.

Non-aqueous hydraulic fluid concentrates, aqueous hydraulic fluid concentrates and aqueous functional fluid compositions, in accordance with this invention, may typically further comprise one or more of the following ingredients: extreme pressure or antiwear additives, dispersants, nonionic or anionic surfactants, ferrous and/or non-ferrous corrosion inhibitors, and amines.

The extreme pressure or antiwear components of the fluids of this invention are well known in the art and individual compounds are typically selected from the broad classes of materials useful for this purpose. Preferred antiwear additives are the metal salts of acid phosphates, chlorinated hydrocarbons, and acid thiophosphate hydroxycarbyl esters, with zinc di(alkyl) or di(aryl) dithiophosphate being especially preferred.

Lubrizol 5604, a trademark of the Lubrizol Corporation, is an especially preferred antiwear additive. This primary alkyl zinc dithiophosphate has a specific gravity of 1.08 at 15.6° C. and a viscosity of 13.5 centistokes (cSt) at 100° C. Its chemical weight percentages of phosphorus, sulfur and zinc range from about 6.8–7.2, 14.3–15.3 and 7.4–8.2, respectively.

Another preferred antiwear additive is a proprietary composition available under the trademark Molyvan L-B from the R. T. Vanderbilt Company, Inc. Molyvan L-B contains molybdenum, sulfur and phosphorus in weight percentages of about 8.1, 12.3 and 6.4, respectively, has a viscosity of 9.07 centistokes at 100° C. and a flash point (COC) of 165.6° C.

The concentration of such extreme pressure and antiwear components may range from about 0.05 to 20 percent by weight of the aqueous concentrate. The extreme pressure or antiwear additive concentration of a functional aqueous fluid composition typically varies from about 0.05 to 5 percent by weight. The concentration of extreme pressure or antiwear additive, in accordance with this invention, is not critical.

The dispersants used in accordance with this invention are well known in the art and individual compounds are typically selected from the broad classes of materials useful for this purpose. These compounds are useful for incorporating oil-soluble, water-insoluble functional additives into aqueous systems, i.e., antiwear, extreme pressure and load-carrying agents, such as dithiophosphates. For example, the dispersants (carboxylic solubilizer/surfactant combinations) disclosed in U.S. Pat. No. 4,368,133 typically are used in water-based hydraulic fluids. These solublizers are made by reacting an acylating agent with N-(hydroxyl-substituted hydrocarbyl) amines and surfactants.

A preferred dispersant utilized in accordance with this invention is available under the trademark Lubrizol 5603 from The Lubrizol Corporation. That dispersant has a viscosity at 100° C. of 650 cSt, a specific gravity of 0.951 at 15.6° C., and a flash point (PMCC) of 83° C. The concentration of dispersant typically ranges from about 0.1 to 30 percent by weight in an aqueous concentrate. The dispersant concentration of an aqueous functional fluid composition typically varies from about 0.1 to 5 percent by weight. The concentration of dispersant, in accordance with this invention, is not critical.

The surfactants or wetting agents utilized in accordance with this invention can be either nonionic or anionic. The surfactant aids in the dispersal of the functional additives in the aqueous system. Typically, the surfactant is a hydrophilic surfactant and, generally has an HLB value in the range of about 10 to 20. See for example, McCutcheon's "Detergents and Emulsifiers", North American Edition, published by McCutheon's Division, MC Publishing Corporation, Glen Rock, N.J., U.S.A., which is hereby incorporated by reference, for their disclosure in this regard.

Of these surfactants, nonionic surfactants are generally used. Among these are the alkylene oxide-treated products, such as ethylene oxide-treated phenols, alcohols, esters, amines and amides. Ethylene oxide/propylene oxide block copolymers are also useful nonionic surfactants. Glycerol esters and sugar esters are also known to be nonionic surfactants. A typical nonionic surfactant class useful with the derivatives of the present invention are the alkylene oxide-treated alkyl phenols such as the ethylene oxide alkyl phenol condensates sold by the Rohm & Haas Company under the family mark, Triton. A specific example is Triton X-100, which contains an average of 9–10 ethylene oxide units per molecule, has an HLB value of about 13.5 and a molecular weight of about 628. Triton X-100 is a specific type of Octoxynol-9, the ethoxylated alkyl phenol that conforms generally to the formula VI:

$$C_8H_{17}C_6H_4(OCH_2CH_2)_nOH \qquad [VI]$$

where n is an integer having an average value of 9.

Another example is Triton X-45 which contains an average of 5 ethylene oxide units per molecule, has an HLB value of about 18.4 and a molecular weight of about 426. Triton X-45 is a specific type of Octoxynol-5, the ethoxylated alkyl phenol that conforms generally to the above-formula VI where n is an integer having an average value of 5.

The water-soluble esters of the ethoxylated $C_8$–$C_{36}$ aliphatic monohydric or polyhydric alcohols with aliphatic acids, and aliphatic dimer acids are typically utilized in accordance with this invention. Such ethoxylated esters have a hydrophilic-lipophilic balance (HLB) in the range of 10 to 20.

Useful ethoxylated aliphatic acids have about 5 to about 20 moles of ethylene oxide added per mole of acid. Examples are ethoxylated oleic acids, ethoxylated stearic acid and ethoxylated palmitic acid. Useful ethoxylated dimer acids are oleic dimer acid and stearic dimer acid. Aliphatic acids can be either branched or straight-chain and can contain from about 8 to about 36 carbon atoms. Useful aliphatic acids include azelaic acid, sebacic acid, dodecanedioic acid, caprylic acid, capric acid, lauric acid, oleic acid, stearic acid, palmitic acid and the like. Especially useful for the purpose of obtaining the water-soluble esters of this invention are aliphatic, preferably the saturated and straight-chain mono- and dicarboxylic acids containing from about 8 to 18 carbon atoms.

The esters of the ethoxylated aliphatic acids and dimer acids utilized in the hydraulic fluids and metalworking lubricant compositions of this invention are reaction products of the ethoxylated monohydric or polyhydric alcohols.

Useful representative monohydric alcohols are n-octyl, n-decyl, n-dodecyl (lauryl), n-tetradecyl (myristyl), n-hexadecyl (cetyl) and n-octadecyl alcohol. Useful representative polyhydric alcohols are ethylene glycol, diethylene glycol, polyethylene glycol, sucrose, butanediol, butenediol, butynediol, hexanediol and polyvinyl alcohol. Glycerol, sorbitol, pentaerythritol, trimethylolethane, and trimethylolpropane are particularly useful polyhydric alcohols which can be ethoxylated and subsequently esterified to produce the esters of ethoxylated aliphatic alcohols useful as components of the hydraulic fluids and metalworking compositions of the invention.

Suitable monohydric aliphatic alcohols are generally those having straight chains and carbon contents of $C_8$–$C_{18}$. The alcohols are ethoxylated so as to add about 5 moles to about 20 moles of ethylene oxide by conventional ethoxylation procedures known to those skilled in the art. Such procedures are carried out under pressure in the presence of alkaline catalysts.

Representative water-soluble polyoxyethylated esters having about 5 to about 20 moles of oxide per mole are the polyoxyethylene derivatives of the following esters; sorbitan monooleate, sorbitan trioleate, sorbitan monostearate, sorbitan tristearate, sorbitan monopalmitate, sorbitan monoisostearate, and sorbitan monolaurate.

Another preferred surfactant is Sipon ESY, a registered trademark of Alcolac Inc. This compound is a modified fatty alcohol, sulfate sodium laureth sulfate, containing approximately one ethylene oxide unit per molecule. Its empirical formula is $C_{12}H_{25}(OCH_2CH_2)_nOSO_3Na$, where n=1–4.

Among the useful anionic surfactants are the widely known metal carboxylate soaps, organosulfates, sulfonates, sulfocarboxylic acids and their salts, and phosphates.

The concentration of surfactant typically ranges from about 0.25 to 20 percent by weight aqueous concentrate. The surfactant concentration of an aqueous functional fluid composition typically varies from about 0.25 to 5 percent by weight. The concentration of surfactant, in accordance with this invention, is not critical.

The ferrous corrosion inhibitors act primarily as chelating agents for iron and its alloys. Such materials are well known in the art and individual compounds can be selected from the broad class of materials useful for this purpose. Boric acid and caprylic acid are preferred ferrous corrosion inhibitors. The concentration of ferrous corrosion inhibitor in aqueous concentrates typically varies from about 0.05 to 10 percent by weight. The concentration in an aqueous functional fluid composition typically varies from about 0.05 to 2 percent by weight. The concentration of ferrous corrosion inhibitor is not critical.

The non-ferrous corrosion inhibitors are used primarily as metal deactivators to chelate copper, aluminum, zinc and their alloys. Such materials are well known in the art and individual compounds can be selected from the broad classes of materials useful for this purpose, such as the various triazoles and thiazoles, as well as the amine derivatives of salicylidenes. Representative specific examples of these metal deactivators are as follows: benzotriazole, tolytriazole, 2-mercaptobenzothiazole, sodium 2-mercaptobenzothiazole, and N,N'-disalicylidene-1,2-propanediamine.

Benzotriazole is a preferred non-ferrous corrosion inhibitor. The aqueous concentrate concentration of the non-ferrous corrosion inhibitor may range from about 0.01 to 5 percent by weight. The concentration in an aqueous functional fluid composition typically varies from about 0.1 to 2 percent by weight. The concentration of non-ferrous corrosion inhibitor is not critical.

Amines are used to neutralize the acidity formed during working of the aqueous solution and present due to other acidic materials within the composition. The type of amine corrosion inhibitor is not critical. The amine also acts as a corrosion inhibitor. Representative amine-type corrosion inhibitors are methylethanolamine, diethanolamime, triethanolamine, morpholine, N-methylmorpholine, N-ethylmorpholine, ethylenediamine, dimethylaminopropylamine, dimethylethanolamine, alpha- and gammapicoline, piperazene and isopropylaminoethanol. Preferred amine corrosion inhibitors are morpholine and isopropylaminoethanol. The amine concentration of an aqueous concentrate typically ranges from about 0.05 to 25 percent by weight. The amine concentration in an aqueous functional fluid composition typically ranges from about 0.5 to 2 percent by weight. The amine concentration, in accordance with this invention, is not critical.

Additionally, biocides may be used to prevent microbial growth in these compostions. Biocides are well known in the art and any effective biocides may be utilized. Examples include phenolic derivatives, such as 2-phenyl phenol, 2-chlorophenol and 2,2'-methylene-bis (4-chlorophenol); formaldehyde release agents, such as the triazines, hexahydro-1,3,5-triethyl-s-triazine and hexahydro-1,3,5-tris (2-hydroxy-ethyl)-s-triazine, the imidazoles, e.g., 1,3-di(hydroxymethyl)-5,5-dimethyl-2,4-dioxolmidazole; aliphatic derivatives, such as, 2-bromo-2-nitropropane-1,3-diol; organosulfur-nitrogen compounds, such as, the thiazoles, and 1,2-benzisothiazolin-3-one. These and other suitable biocides are disclosed in Tribology International, December 1983, Vol. 16 (6): 328–330. Preferred biocides are the triazines and sodium omadine.

The biocide concentration typically ranges from about 0.05 to 5 percent by weight of the total weight of the aqueous concentrate.

Methods for preparing the water-based hydraulic and metalworking fluids of this invention are well-known in the art. The basic procedure involves mixing the polyurethane and dimer ester to form a thickener composition, followed by heating and adding the remaining components. In one aspect, a non-aqueous concentrate of the thickener composition and additives is provided. In another aspect, an aqueous concentrate is provided by employing a minor amount of water based on the weight of the total concentrate.

Preparations of the compositions of the invention are carried out using conventional equipment and at temperatures from room temperature to elevated temperatures, usually below 212° F., and often below 170° F. The non-aqueous or aqueous concentrate at a high actives concentration is then diluted with water, wherein the total amount of water, used is in the amount required to provide the desired concentration of functional additives. This is often a convenient procedure, since the concentrate can be shipped to the point of use before the water is added. Thus, the cost of shipping all or a substantial amount of the water in the final water-based functional fluid composition is saved.

In one aspect, only the water necessary to formulate the aqueous concentrate (which is determined primarily by ease of handling and convenience factors), need be shipped. Alternatively, the functional fluid composition can be made directly or via a non-aqueous concentrate without going through the separate step of forming an aqueous concentrate.

The functional fluid compositions are easily formulated using distilled or deionized water, although tap water can also be used without adverse effects on fluid properties.

Typical ingredients of the aqueous concentrates of the invention are listed below:

| Typical Percentage Ranges For Hydraulic Fluid or Metalworking Fluid Concentrate Components | |
|---|---|
| Component | Percent by Weight |
| Polyurethane | 0.05–50 |
| Dimer Ester | 0.05–50 |
| Amine | 0.05–25 |
| Corrosion Inhibitor | 0.01–15 |
| Antiwear Additive | 0.05–20 |
| Surfactant | 0.25–20 |
| Dispersant | 0.10–30 |
| Biocide | 0.05–5 |
| Water | 20–50 |

Typical functional water-based hydraulic or metalworking fluid compositions, in accordance with the teachings of this invention, may contain the components in the percentage ranges shown below.

| Typical Percentage Ranges For Hydraulic Fluid or Metalworking Fluid Composition Components | |
|---|---|
| Component | Percent by Weight |
| Polyurethane | 1–5 |
| Dimer Ester | 3–15 |
| Antiwear Additive | 0.25–2 |
| Dispersant | 0.25–5 |
| Amine | 0.1–5 |
| Corrosion Inhibitor | 0.01–2 |
| Surfactant | 0.1–10 |
| Biocide | q.s. |
| Water | 60–95 |

The functional fluid compositions of this invention, when formulated as above, are transparent liquids having an oil-like viscosity, which are stable over long periods of storage at ambient temperature. Additionally, the hydraulic and metalworking fluids of this invention are oil-free and will not support combustion in contrast to petroleum oils. The fluids of this invention are ecologically clean and nonpolluting compositions when compared to existing petroleum-based hydraulic fluids.

The hydraulic fluids of the subject invention can be used in various applications requiring hydraulic pressures in the range of 20–2000 pounds per square inch, since they generally exhibit all the essential properties required such as lubricity, viscosity and corrosion protection. The hydraulic fluids of this invention are suitable for use in various types of hydraulic systems and are especially useful in systems in which vane-type pumps or the axial-piston pumps are used. Such pumps are used in hydraulic systems where pressure is required for molding, clamping, pressing metals, actuating devices such as doors, elevators, and other machinery or for closing dies in die-casting machines and in injection molding equipment and other applications.

In the following Examples, certain preferred embodiments are illustrated.

EXAMPLE 1

To demonstrate the interaction of the polyurethane of the invention and the dimer ester of the invention, two test runs were conducted. A commercially available water-based, non-thickened hydraulic fluid concentrate was employed. This commercial product was sold as a propriety concentrate, SUNSOL HWBF by Sun Oil Co., and has been reported to be formulated as follows:

| SUNSOL HWBF (high-water base hydraulic fluid) | |
|---|---|
| Ingredient | Wt. % |
| ethoxylated alkyl phenol | 10.0 |
| branched hydrocarbon polymer (acidified) | 20.0 |
| zinc dithio-octyl-phosphate | 8.0 |
| N,N—dimethyl ethanolamine | 2.7 |
| water | 59.3 |
| pH is 9.5 | 100.0 |

The test samples were prepared as follows: The dimer ester and/or polyurethane were admixed and heated to a temperature between 150° to 160° F. and thereafter added to distilled water at a temperature from 150°–160° F. Heating was discontinued and the SUNSOL HWBF concentrate was added. The final formulation was cooled to 90° F.

Thereafter each sample was tested according to the following procedure:

The composition employed in run 1 was tested on a Vickers 104C Vane Pump as follows: Place backplate on and tighten by hand loosely, then start pump with no back pressure. Begin test by tightening bolts to 10 in-lb., making sure opposite face bolts are tightened before tightening the next bolt. Tighten bolts to 20 in-lb. and increase pressure up to 200 PSI. Tighten bolt to 30 in-lb. and raise pressure up to 400 PSI. Raise final torque 50–75 in-lb. and final pressure 800 PSI and check wear rates at 100, 250, 400 and 500 hrs. Wear rate should not exceed 10 mg/hr. (5000 mg/500 hr.); and temperature of fluid should be maintained at 120° F.

The run 2 composition was tested on a Rexnord SV-20 Hydraulic Vane Pump as follows: After priming, run pump at 200 PSI for 5 min; run pump at 400 PSI for 5 min; run pump at 600 PSI for 5 min; run pump at 800 PSI for 5 min; and run pump at 1000 PSI for 5 min. Run pump 30 min., then shut down. Take fluid sample from reservoir; weigh ring and vanes and record weight. Lubricate vanes and run pump as before. After 100 hrs. and at 100 hour intervals thru 900 hrs. shut pump down and take fluid samples. At 1000 hours shut pump down and take fluid samples. The samples employed were as follows:

| Ingredients | Composition of Run 1 | Composition of Run 2 |
| --- | --- | --- |
| SCT-100 (Polyurethane) | 3.5 | 3.0 |
| SFEX81-187-360 (Dimer Ester) | — | 3.0 |
| SunSol HWBF | 5.0 | 5.0 |
| Deionized Water | 91.5 | 89.0 |
|  | 100.0 | 100.0 |

The test results were as follows:

| Shear Stability Results[1] | | | |
| --- | --- | --- | --- |
|  | Time (Hours) | Viscosity at 100° F. (cst) | % Viscosity Loss |
| Run 1 | 0 | 10 | —[2] |
| Run 2 | 0 | 42.74 |  |
|  | 21.1 | 42.03 |  |
|  | 87.3 | 41.97 | 1.8 |

[1]The dimer ester, by itself, did not maintain sufficient viscosity to conduct the shear stability tests and therefore further testing was not conducted.
[2]Too thin for pump.

As shown in the results above, the combination of polyurethane and dimer ester is significantly more shear stable than the polyurethane alone.

EXAMPLE 2

The following test samples were prepared:

| Ingredients | Hydraulic Fluid Samples (Percent by Weight) | | |
| --- | --- | --- | --- |
|  | Sample 3 | Sample 4 | Sample 5 |
| Morpholine[1] | 0.25 | 0.60 | 0.25 |
| Monoethanolamine[1] | 0.10 | — | 0.10 |
| Benzotriazole[2] | 0.05 | 0.05 | 0.05 |
| SFEX81-360-187 (Dimer Ester) | 3.00 | 3.00 | 3.00 |
| SCT 100 (Polyurethane) | 3.00 | 3.00 | 3.00 |
| Lubrizol 5604 (Zinc Dithiophosphate) | 0.75 | 0.75 | — |
| Caprylic Acid[3] | 0.20 | 0.20 | 0.20 |
| Triton X-45 (Surfactant) | — | 0.19 | — |
| Sipon ESY (Surfactant) | — | 0.19 | — |
| Dimethyl Ethanolamine[1] | — | 0.08 | — |
| Lubrizol 5603 (Dispersant) | — | 1.05 | — |
| Molyvan L-B (Antiwear Additive) | — | — | 0.50 |
| Deionized Water | 92.65 | 90.90 | 93.00 |

[1]Neutralizer and ferrous corrosion inhibitor.
[2]Non-ferrous corrosion inhibitor.
[3]Ferrous corrosion inhibitor.

Sample 3 was prepared by mixing all ingredients, except distilled water, and heating to 150°–160° F. This mixture was added to distilled water at 150°–160° F. to form the solution and then cooled.

Sample 4 was prepared by first heating Lubrizol 5603 to 130°–150° F. and mixing in Triton X-45, Sipon ESY, and dimethyl ethanolamine to form an intermediate. Next, SFE X81-358-187, SCT-100, Cobratec 99 (benzotriazole), Lubrizol 5604, morpholine, and caprylic acid were mixed and heated to 150°–160° F. Distilled water at 150° F. was added. The heat was cut and the intermediate added to this mixture and then cooled.

Sample 5 was prepared by mixing all ingredients, except distilled water, and heating to 180° F. This mixture was added to distilled water at 160° F. to form the solution and then cooled and filtered.

Shear stability results of these samples are measured by running viscosity at 100° F. before and after time on the Vickers 104C Vane Pump, following the procedure given in Example 1, and calculating the percent viscosity loss.

As shown below, the compositions of this invention exhibited greater shear stability than a comparative sample tested. The comparative sample is a commercially-available, water-thickened hydraulic fluid, Plurasafe P-1200 from the BASF Wyandotte Corporation. This proprietary composition was reported to have the following composition:

| Comparative Sample 1 | |
| --- | --- |
| Component | Wt. % |
| alkyl polyether (polyglycol) | 43.5 |
| sodium benzoate | 1.5 |
| 2-amino-2-methyl-1-propanol | 5.9 |
| water | remainder |

No urethane or dimer ester was detected upon analysis. The Plurasafe P-1200 hydraulic fluid concentrate was diluted with nine parts of water to one part of concentrate prior to use.

| Shear Stability (Vickers 104C Vane Pump) | | | |
| --- | --- | --- | --- |
|  | Test Time Hours | Viscosity at 100° F. (cst) | Viscosity % Change |
| Sample 3 | 0 | 39.29 | — |
|  | 63 | 42.23 | +7.5 |
|  | 182.8 | 36.06 | −8.2 |
|  | 277.0 | 34.14 | −13.1 |
| Sample 4 | 0 | 48.20 | — |
|  | 39 | 47.48 | −1.5 |
|  | 155.8 | 42.13 | −12.6 |
|  | 321.6 | 30.62 | −36.5 |
| Sample 5 | 0 | 42.62 | — |
|  | 43.1 | 40.36 | −5.3 |
|  | 159.1 | 38.96 | −8.6 |

-continued

| Shear Stability (Vickers 104C Vane Pump) | | | |
|---|---|---|---|
| | Test Time Hours | Viscosity at 100° F. (cst) | Viscosity % Change |
| | 252.4 | 36.94 | −13.3 |
| Comparative | 0 | 43.20 | — |
| Sample 1 | 42.8 | 37.53 | −13.1 |
| | 161.5 | 31.65 | −26.7 |
| | 237.6 | 25.22 | −41.6 |

As shown below, the compositions of this invention exhibited less wear (weight loss of ring and vanes) than comparative sample 1. The same procedure given in Example 1 was utilized here.

| Wear Properties on a Hydraulic Pump (weight loss of ring and vanes) (Vickers 104C Vane Pump) | | |
|---|---|---|
| Product | Test Time (hours) | Total Wear-Loss in Weight Ring and Vanes (grams) |
| Sample 3 | 63.0 | 2.652 |
| | 182.8 | 6.203 |
| | 277.0 | 8.381 |
| Sample 4 | 39.0 | 1.211 |
| | 155.8 | 3.733 |
| | 321.6 | 6.317 |
| Sample 5 | 43.1 | 1.317 |
| | 159.1 | 4.672 |
| | 252.4 | 8.621 |
| | 323.3 | 10.013 |
| | 369.2 | 10.171 |
| | 429.5 | 10.914 |
| | 452.5 | 10.994 |
| Comparative | 42.8 | 1.652 |
| Sample 1 | 161.5 | 6.452 |
| | 237.6 | 11.606 |

EXAMPLE 3

The cutting ability of fluid compositions of the invention was measured on a No. 8 Falex Tap Torque Tester and the results were based on a specimen nut blank of 4140 steel and specifications of 0.33615±0.00015 in. (75% tread) with the speeds and feeds outlined in "Statistical Evaluation of the Falex Tapping Torque Tester" by T. H. Weer and E. Holodnik, Lubrication Engineering (September 1980), Vol. 36(9): 513–529.

The results, as shown below, are mean values of actual torque readings in Newton-meters. The typical standard deviation is 0.2–0.4. Even though the results obtained were slightly higher than for oil-based products, the samples formulated in accordance with this invention show good results especially when the percent actives of each formulation is taken into consideration.

From the results, it is apparent that similar metalworking fluids with similar viscosities can be formulated in accordance with the teachings of the instant invention. Additionally, the lubrication values (Tap Torque Values) of the compositions of this invention are similar to those of various commercial formulations. When a comparison is made on the basis of percent actives (percent product), the formulations in accordance with this invention exhibit favorable lubrication qualities when compared with various commercial formulations. The test samples of the invention, samples 3 and 4, are the same as that shown in Example 2 above.

The Trim-Sol product tested is a proprietary soluble oil fluid manufactured by the Master Chemical Company. Its composition is reported to be as follows:

| Trim-Sol Soluble Oil Fluid | |
|---|---|
| Components | Wt. % |
| Sodium Salt of a Sulfonated Hydrocarbon | 8.5 |
| Oleate Soap, Mostly Sodium | 1.5 |
| Ethoxylated, Branched Octyl Phenol (10 Moles Ethylene Glycol) | 2.7 |
| Propylene Glycol, Mono and Propyl Ether | 3.5 |
| Phenolic Biocide | 2–3 |
| Water | 2.5 |
| Safrole | 0.3 |
| Hydrocarbon Oil | 78–79 |

Plurasafe P-1210 is a proprietary water-thickened hydraulic fluid sold by BASF the Wyandotte Corporation.

Its formulation is believed to be as follows:

| Plurasafe P-1210 | |
|---|---|
| Components | Wt. % |
| Alkyl polyether | 6.0 |
| Triethanolamine | 1.7 |
| zinc and sulfur compounds | 1-2 |
| water | balance |

No Urethane or dimer ester were reported to be a component of these commercial formulations.

| Cutting Efficiency of Inventive Formulations and Comparative Samples | | | | | |
|---|---|---|---|---|---|
| Product | Type | Additive Used | % Actives | Viscosity at 100° F. (cst) | No. 8 Tap Torque Mean (N-M) |
| Trim-Sol | Soluble Oil | Fatty Acid, Chlorine | 100 | 64.6 | 7.83 |
| Trim-Sol | Soluble Oil | Fatty Acid, Chlorine | 10 | 10 | 9.02 |
| P-1200 | Thickened Hydraulic Fluid | Phosphorous | 4 | 43.0 | 8.80 |
| P-1210 | Thickened Hydraulic Fluid | 2% Zinc Dithiophosphate | 8 | 53.59 | 8.85 |
| Sample 3[1] | — | None | 6.6 | 43.22 | 9.02 |
| Sample 3 | — | 0.75% Zinc Dithiophosphate | 7.35 | 52.4 | 8.68 |
| Sample 4 | — | 0.75% Zinc Dithiophosphate | 8.50 | 49.30 | 8.79 |
| Sample 3[1] | +1% fat chlorine | 1.0% chlorine | 7.6 | 52.00 | 8.62 |
| Sample 3[1] | +1% Diethanol Disulfide | 4.0% sulfur | 7.6 | 47.00 | 8.79 |

| Cutting Efficiency of Inventive Formulations and Comparative Samples | | | | | |
|---|---|---|---|---|---|
| Product | Type | Additive Used | % Actives | Viscosity at 100° F. (cst) | No. 8 Tap Torque Mean (N-M) |
| Sample 3[1] | Chlorinated Fat, Phosphate Ester | 1.0% chlorine, 0.4% phosphorous | 9.6 | 48.00 | 8.62 |

[1]Same as Sample 3 without zinc dithiophosphate, plus the "additives used".

The present invention is not to be limited except as set forth in the following claims.

What is claimed is:

1. A thickener composition comprising:
   (1) at least one water-soluble, thermoplastic, organic polymer having a weight average molecular weight of at least about 10,000 which comprises hydrophobic segments, each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer, and
   (2) at least one water-soluble polyester which comprises, the condensation product of
       (a) a polyoxyalkylene glycol having a molecular weight of from about 400 to about 1000; and
       (b) the addition product of
           (1) a dimer fatty acid; and
           (2) from about 0.4 to about 0.8 equivalents of maleic anhydride for each equivalent of the dimer fatty acid wherein about 2.1 to about 3.2 equivalents of the glycol are used for each equivalent of the addition product.

2. A thickener composition according to claim 1, wherein the water-soluble, thermoplastic, organic polymer is a polyurethane having the following structure:

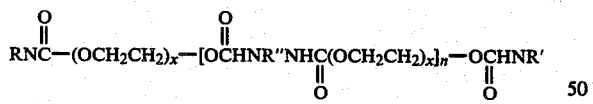

wherein R and R' are each $C_{12}-C_{18}$ alkyls; R" is a $C_7-C_{36}$ alkyl; x is an integer from 90 to 455 and n is an integer from 1 to 4.

3. A thickener composition according to claim 1, wherein the water-soluble, thermoplastic, organic polymer is a polyurethane having the following structure:

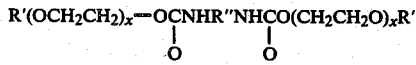

wherein R and R' are each $C_{12}-C_{18}$ alkyls; R" is a $C_7-C_{36}$ alkyl; x is an integer from 90 to 455 and n is an integer from 1 to 4.

4. A thickener composition according to claim 1, wherein the water-soluble polyester has the following structure:

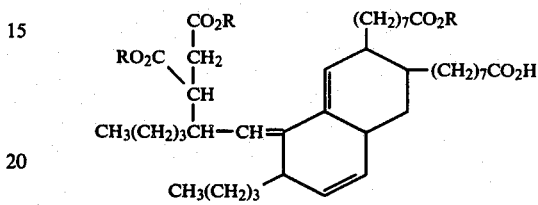

wherein R is a polyethylene glycol having an average value of 400 oxyethylene groups.

5. A thickener composition according to claim 1, wherein the ratio of polymer to dimer ester ranges from about 100:1 to 1:100.

6. A thickener composition according to claim 1, wherein the ratio of polymer to dimer ester ranges from about 5:3 to 1:1.

7. An aqueous concentrate comprising:
   (1) at least one water-soluble, thermoplastic, organic polymer having a weight average molecular weight of at least about 10,000 which comprises hydrophobic segments, each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer,
   (2) at least one water-soluble polyester which comprises, the condensation product of
       (a) a polyoxyalkylene glycol having a molecular weight of from about 400 to about 1000, and
       (b) the addition product of
           (1) a dimer fatty acid;
           (2) from about 0.4 to about 0.8 equivalents of maleic anhydride for each equivalent of the dimer fatty acid wherein about 2.1 to about 3.2 equivalents of the glycol are used for each equivalent of the addition product; and
   (3) an aqueous carrier in a minor amount of said concentrate.

8. An aqueous concentrate according to claim 7 wherein the water-soluble, thermoplastic, organic polymer is a polyurethane having the following structure:

wherein R and R' are each $C_{12}-C_{18}$ alkyls; R" is a $C_7-C_{36}$ alkyl; x is an integer from 90 to 455 and n is an integer from 1 to 4.

9. An aqueous concentrate according to claim 7 wherein the water-soluble, thermoplastic, organic polymer is a polyurethane having the following structure:

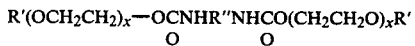

wherein R and R' are each $C_{12}$–$C_{18}$ alkyls; R" is a $C_7$–$C_{36}$ alkyl; x is an integer from 90 to 455 and n is an integer from 1 to 4.

10. An aqueous concentrate according to claim 7, wherein the water-soluble polyester has the following structure:

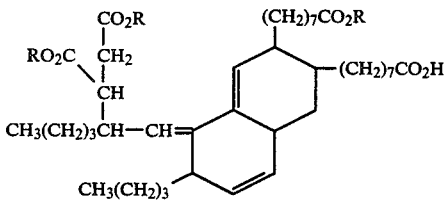

wherein R is a polyethylene glycol having an average value of 400 oxyethylene groups.

11. An aqueous concentrate according to claim 7, wherein the polyurethane is present in a quantity of about 0.05 to 50 percent by weight of the total composition.

12. An aqueous concentrate according to claim 7, wherein the dimer ester is present in a quantity of about 0.05 to 50 percent by weight of the total composition.

13. An aqueous functional fluid composition comprising:
(1) at least one water-soluble, thermoplastic, organic polymer having a weight average molecular weight of at least about 10,000 which comprises hydrophobic segments, each containing at least one monovalent hydrophobic group covalently bonded to the polymer, wherein the polymer has an amount of hydrophobe bunching comprising at least two monovalent hydrophobic groups per hydrophobic segment, sufficient to provide for enhanced thickening of aqueous solutions containing the polymer;
(2) at least one water-soluble polyester which comprises, the condensation product of
(a) a polyoxyalkylene glycol having a molecular weight of from about 400 to about 1000, and
(b) the addition product of
(1) a dimer fatty acid; and
(2) from about 0.4 to about 0.8 equivalents of maleic anhydride for each equivalent of the dimer fatty acid wherein about 2.1 to about 3.2 equivalents of the glycol are used for each equivalent of the addition product; and
(3) an aqueous carrier in a major amount of said composition.

14. An aqueous functional fluid composition according to claim 13, wherein the water-soluble, thermoplastic, organic polymer is a polyurethane having the following structure:

wherein R is a polyethylene glycol having an average value of 400 oxyethylene groups.

15. An aqueous functional fluid composition according to claim 13, wherein the water-soluble, thermoplastic, organic polymer is a polyurethane having the following structure:

wherein R and R' are each $C_{12}$–$C_{18}$ alkyls; R" is a $C_7$–$C_{36}$ alkyl; x is an integer from 90 to 455 and n is an integer from 1 to 4.

16. An aqueous functional fluid composition according to claim 13, wherein the water-soluble polyester has the following structure:

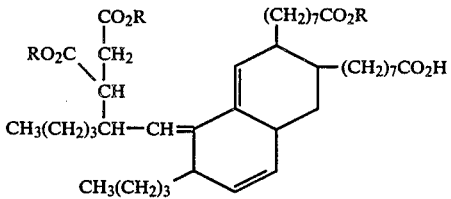

wherein R is a polyethylene glycol having an average value of 400 oxyethylene groups.

17. An aqueous functional fluid composition according to claim 13, wherein the polyurethane is present in a quantity from about 0.05 to 25 percent by weight of the total composition.

18. An aqueous functional fluid composition according to claim 13, wherein the dimer ester is present in a quantity from about 0.05 to 25 percent by weight of the total composition.

* * * * *